United States Patent [19]

Winsor

[11] 4,044,850
[45] Aug. 30, 1977

[54] WHEELCHAIR

[76] Inventor: Malcolm C. Winsor, Pond Road, Mont Vernon, N.H. 03057

[21] Appl. No.: 567,547

[22] Filed: Apr. 14, 1975

[51] Int. Cl.² .............................................. B62D 55/04
[52] U.S. Cl. .......................... 180/9.2 C; 280/242 WC; 280/5.22
[58] Field of Search ...................... 180/9.2 C, 9.28, 9.3, 180/9.24, 9.34, 9.54; 280/5.22, 242 WC, DIG. 10

[56] References Cited

U.S. PATENT DOCUMENTS

| | | | |
|---|---|---|---|
| 3,191,953 | 6/1965 | Aysta | 280/242 WC X |
| 3,231,290 | 1/1966 | Weyer | 280/5.22 |
| 3,292,722 | 12/1966 | Bamberg | 280/5.22 |
| 3,529,688 | 9/1970 | Bruce | 280/5.22 |

Primary Examiner—Philip Goodman
Attorney, Agent, or Firm—Robert T. Dunn

[57] ABSTRACT

A wheelchair with relatively large diameter wheels on each side of the chair frame and two smaller wheels in front carries one or more continuous traction belts beneath the seat and/or the back of the chair in retracted position when the chair is used on a flat surface. The large wheels are each attached to the frame by a lever controlled mechanism manipulated by the operator to raise the large wheels, lowering the seat and tilting the chair backward so that the chair rides on the continuous traction belts. This action is taken at a steep incline or at steps to place the operator in a safe, comfortable position with lowered center of gravity for ascending or descending the steps. Means such as an electric motor is provided for driving the traction belts to carry the operator safely up or down the incline or steps.

23 Claims, 11 Drawing Figures

TRANSFER TO CLIMBING MODE

CLIMBING MODE

TRANSITION OVER TOP STEP

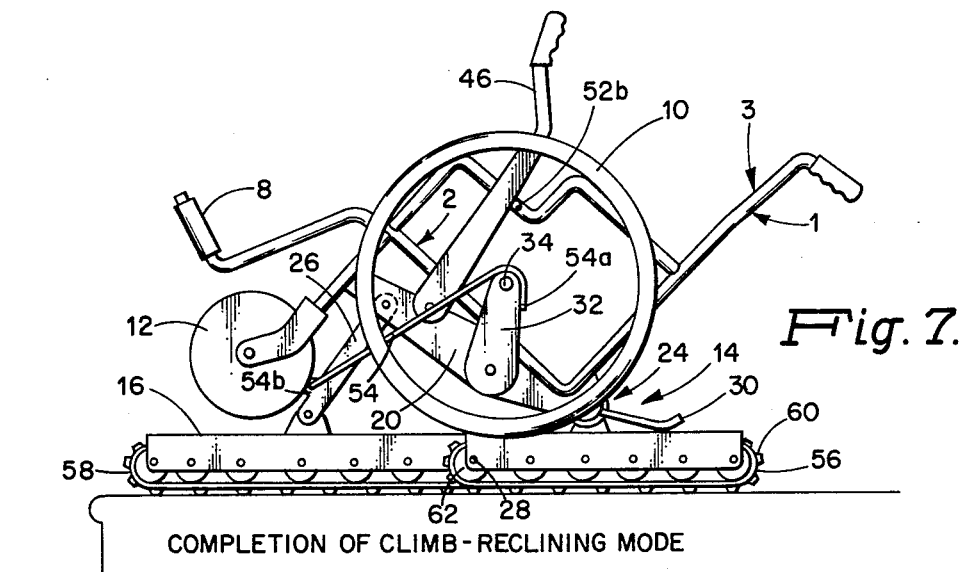
COMPLETION OF CLIMB-RECLINING MODE
Fig. 7.
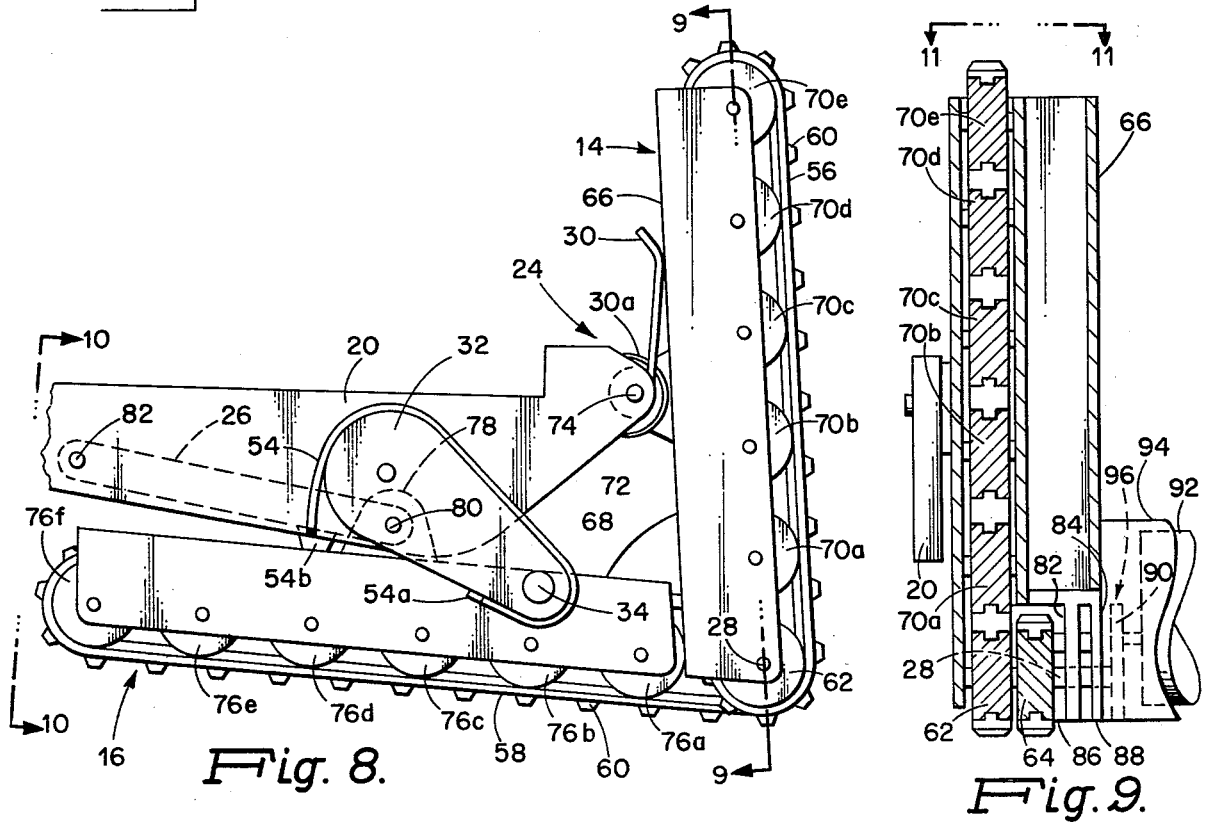
Fig. 8.
Fig. 9.
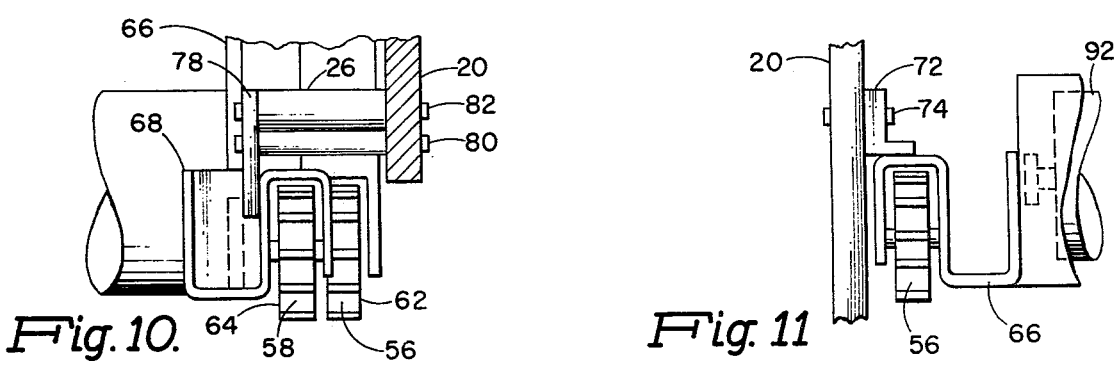
Fig. 10.
Fig. 11.

WHEELCHAIR

BACKGROUND OF THE INVENTION

The present invention relates generally to wheelchairs and more particularly, to wheelchairs which are specially equipped for ascending or descending stairs or steep inclines.

It is well-known to provide a wheelchair with endless traction belts to aid in ascending and descending stairs and inclined surfaces, as well as traveling over level horizontal surfaces. It is well-known to provide motors for driving wheelchairs, particularly for driving the endless traction belts to ascend and descend stairs. Heretofore, numerous techniques have been employed to equip wheelchairs and the like to ascend and descend stairs. Some of these mechanisms are limited to ascending and descending curbs or single steps at a time.

It has been suggested to equip a chair with a combination of endless traction belts in front, beneath and in back of the chair so that the chair rides at all times on one or more of the belts and when the operator is ascending or descending stairs, the front or rear belts, respectively, are used. Other mechanisms which are particularly suited for climbing and descending curbs employ levers to raise and/or lower the front of the chair to climb or descend a curb. Yet another type of mechanism provides the large side wheels of the chair constructed of a multitude of segments which fold so that these wheels can change shape to accomodate stairs.

These and other mechanisms provided in the past to enable the operator of a wheelchair to ascend and descend stairs generally support the chair and operator in the conventional upright position and do not lower the center of gravity of the operator and the chair with reference to the stair tread directly beneath the center of gravity. Hence, the hazards suffered by the operator if the chair should slip or fall over while climbing or descending stairs are considerably greater than would be encountered on a level surface. Furthermore, none of these mechanisms are so designed that the operator can easily reach the stair treads in back of or alongside the wheelchair while ascending or descending the stairs to remove any objects that may be in the way.

SUMMARY OF THE INVENTION

It is one object of the present invention to provide a wheelchair capable of ascending and descending stairs. It is a further object to provide such a wheelchair wherein at least some of the above described limitations of prior wheelchairs equipped for ascending and descending stairs are avoided.

It is another object to provide a wheelchair having a relatively large wheel on each side and used in a conventional manner on flat or level ground and which is specially adapted and equipped for climbing stairs on one or more endless traction belts which are carried beneath or in back of the chair.

It is a further object in conjunction with the above to provide such a wheelchair wherein the operator's center of gravity with reference to a stair tread directly below the operator is substantially lower when ascending or descending stairs than when riding on level ground.

It is another object to provide a wheelchair capable of ascending and descending stairs with the operator at a substantially lower, partly reclining position relative to the horizontal.

It is a further object to provide a wheelchair capable of ascending and descending stairs wherein the operator can readily reach with his hand stair treads immediately alongside and above the wheelchair.

It is a further object to provide a compact, relatively light weight wheelchair capable of ascending and descending stairs and steep inclines.

The embodiment of the present invention described herein incorporates all features of the invention. It includes a wheelchair frame which carries one or more endless traction belts in retracted positions beneath the seat or in back of the chair. In combination with this feature, the two main side wheels of the wheelchair are mounte to the sides of the frame by a retracting mechanism which enables the operator to raise and lower the side wheels. They are lowered for conventional use of the wheelchair on level ground. They are raised by the operator when the wheelchair is to ascend or descend stairs or a steep incline and when raised sufficiently, the chair frame rides on the endless traction belts.

In this embodiment, two endless traction belts are provided on each side of the chair, one beneath the seat on each side and one just behind the back of the chair on each side. The belts on each side are parts of traction belt assemblies that pivotally connect, end to end and both assemblies pivotally attach to the chair frame and are oriented with respect to the chair so when the large side wheels are raised by the operator, the operator's center of gravity is substantially lowered and he is tilted backwards to a partially reclining position. Means (which may include an electric motor) are provided for driving the belts to carry the chair up or down the stairs with the operator positioned sufficiently close to the stairs that he is secure against the hazards of falling and he can reach and touch the stair treads alongside and just above the wheelchair.

The above objects and features of the present invention will become apparent from the following description of a specific embodiment of the invention taken in conjunction with the accompanying drawings. The embodiment represents the construction and method of operation of a wheelchair incorporating the features.

BRIEF DESCRIPTION OF DRAWINGS

FIGS. 4 to 7 are side views of the wheelchair with the large side wheels raised and the chair riding on the endless traction belts in the climbing mode at the bottom of a set of stairs, midway up the stairs, at the transistion over the top step of the stairs and at the completion of the climb, respectively.

FIG. 8 is an enlarged view showing the construction of the endless traction belt assemblies on the left side of the wheelchair;

FIG. 9 is a cross section view taken through one of the rear assemblies and showing the drive motor carried thereon;

FIG. 10 is an end view showing particularly the forward endless traction belt assembly and construction of the pivotal mount of this assembly to the chair frame; and FIG. 11 is an end view of the rear endless traction belt assembly.

DESCRIPTION OF AN EMBODIMENT OF THE INVENTION

Figure 1:
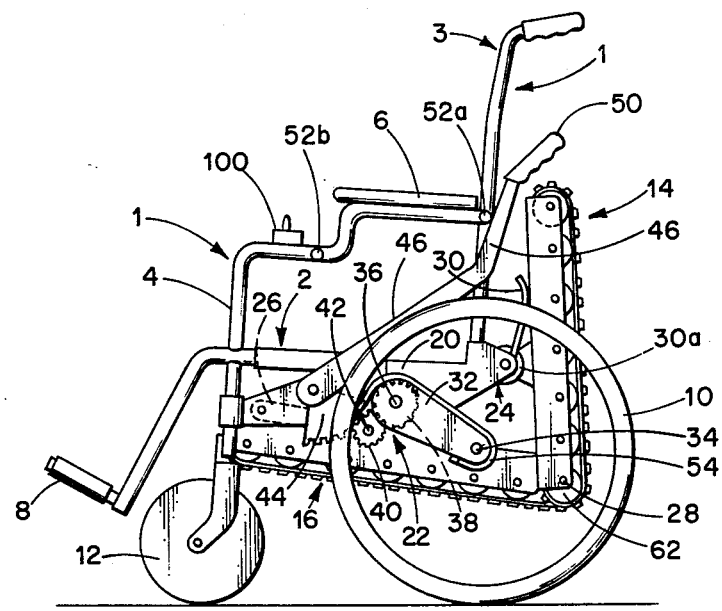
FIG. 1 is a side view of the wheelchair with the large side wheels down, the endless traction belts retracted and the wheelchair ready for use on level ground.
Figure 2:
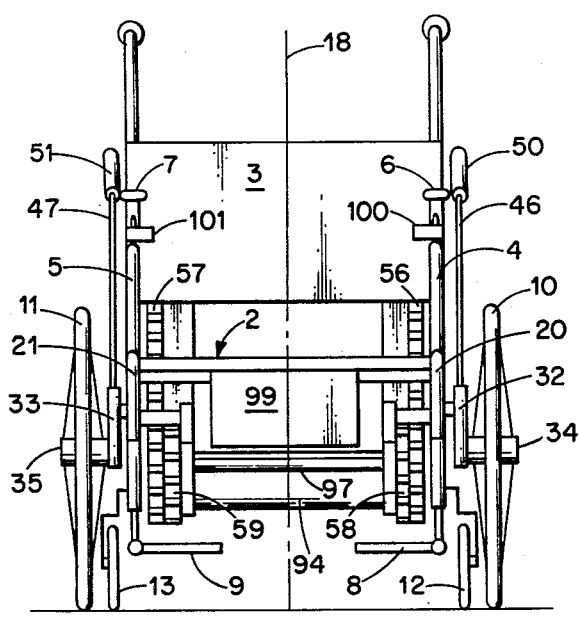
FIG. 2 is a front view of the wheelchair on level ground.
Figure 3:
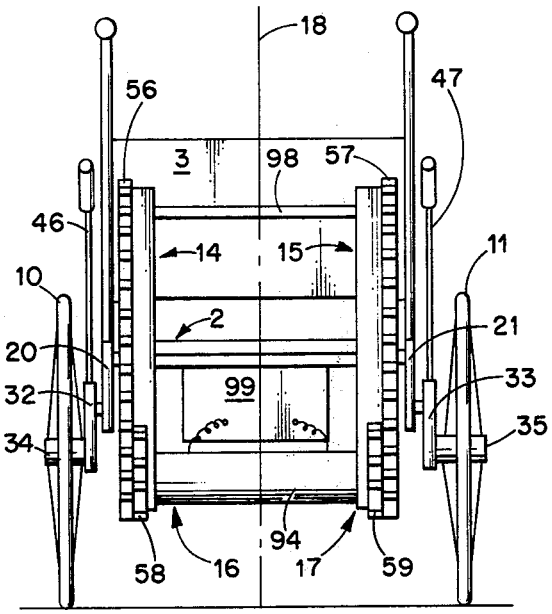
FIG. 3 is a rear view of the wheelchair on level ground.

The embodiment of the present invention which incorporates all of the features mentioned heretofore is shown in FIGS. 1, 2 and 3. This embodiment has the appearance of a conventional wheelchair, inasmuch as it includes a seat with two large main wheels, one on each side, two much smaller forward wheels and rests for the operator's feet. The wheelchair may be used on level ground in a conventional manner by the operator sitting in the seat manually driving the main wheels to move forward or backward or turn in either direction. The wheelchair is preferably made of light metal, plastic and fabric designed for strength, economy of weight and safety.

The wheelchair frame, denoted generally 1, is constructed of light metal pieces which may be tubular aluminum and includes a seat 2, a back 3, a left side 4 and a right side 5. Left and right arm rests 6 and 7 may be part of the sides. Extending from the seat are left and right foot rests 8 and 9, respectively. When this wheelchair is used in the level or floor mode, it rides on the left and right main wheels 10 and 11 mounted at the left and right side of the frame toward the rear of the frame and the left and right caster wheels 12 and 13 mounted to the frame toward the front thereof. In operation, the operator sits in the seat with his feet on the foot rests and with his left and right hands rotates the large main wheels forward or backward as he wishes to move forward or backward or turn on the floor level. Clearly, this operation is quite conventional and well-known in the art.

Two endless traction belts are carried on each side of the wheelchair adjacent the inside of the main wheel on each side. On the left side are two endless traction belt assemblies, the rear assembly 14 and the forward assembly 16, respectively. The corresponding rear and forward endless traction belt assemblies on the right side, just inside the right main wheel, are denoted 15 and 17, respectively. The left and right traction belt assemblies and the left and right main wheels and all the mechanisms for mounting these to the frame may be identical on the left side and right side except for lefthandedness or righthandedness of the corresponding parts. Hence, the complete structure including the chair frame may be completely symmetrical about a plane 18 taken as shown in FIGS. 2 and 3.

Each of the main wheels 10 and 11, as well as the front and rear continuous traction belt assemblies immediately adjacent each wheel are mounted to corresponding left or right mount plate 20 and 21, respectively. These mount plates are attached to the front and rear of the frame along and just beneath the seat. Since the left and right main wheels and traction belt assemblies are constructed and mounted as mirror images of each other with respect to the plane 18, only the details of the left side (denoted by even reference numbers) will be described herein. Corresponding parts on the right side are denoted by the next greatest odd number. On the left side are the main wheel attachment and control mechanism 22, rear traction belt assembly 14 mounted to plate 20 at hinge 24 and the forward traction belt assembly 16, connected to the plate by the forward link 26. The forward end of the rear belt assembly 14 and the rear end of the forward belt assembly 16 are pivotally connected together by a common axel 28 and they are held in the retracted position by cable 54, as described below and shown in FIG. 1. They are urged to the down positions, shown in FIG. 4 to 7 by tortion spring 30 attached to the hinge 24 that urges the rear belt assembly 14 in the clockwise direction about the hinge. This spring force is sufficient to prevent the two traction belt assemblies from retracting as the main wheels are raised and the weight of the wheelchair and the operator rests upon the traction belts. When that occurs, the weight of the chair and operator, distributed as it is, prevents retraction. Rotation of the rear belt assembly 14 on the hinge 24 should be damped to limit the rotation speed. For this purpose hydraulic damper 30a may be provided at the hinge.

The main wheel attachment and control mechanism 22 includes a wheel arm 32 which connects to the main wheel 10 at the hub or axel 34 of the wheel. The other end of the arm 32 is attached at arm axel 36 carried by plate 20. The arm gear 38 on this axel, attached to the arm 32, meshes with idler gear 40 on idler gear axel 42 also carried by the plate. The idler gear meshes with a larger gear, the wheel lever control gear 44, that is fixedly attached to the wheel control lever 46 attached to axel 48 also carried by plate 20. This control lever 46 extends upward alongside the seat and has a convenient handle 50 at the end. A lever catch or lock 52a on the side of the chair secures this lever in a position shown in FIG. 1 and, in effect, locks the main wheels down in the position shown.

The retracting cable 54 wraps around the hub end of wheel arm 32 and attaches thereto. It reaches to the forward link 26 and pulls the link and forward traction belt assembly 16 to the retracted position, shown in FIG. 1, when the side wheels are lowered to support the weight of the chair and the operator for use of the wheelchair on the level. Cable 54 rides over arm 32 which may be grooved like a pulley to accomodate the cable. The cable attaches at 54a to arm 32 and at 54b to link 26 and, when retracted, it rides over both ends of arm 32 as shown in FIG. 1.

TRANSFER OF CLIMBING MODE

Figure 4:
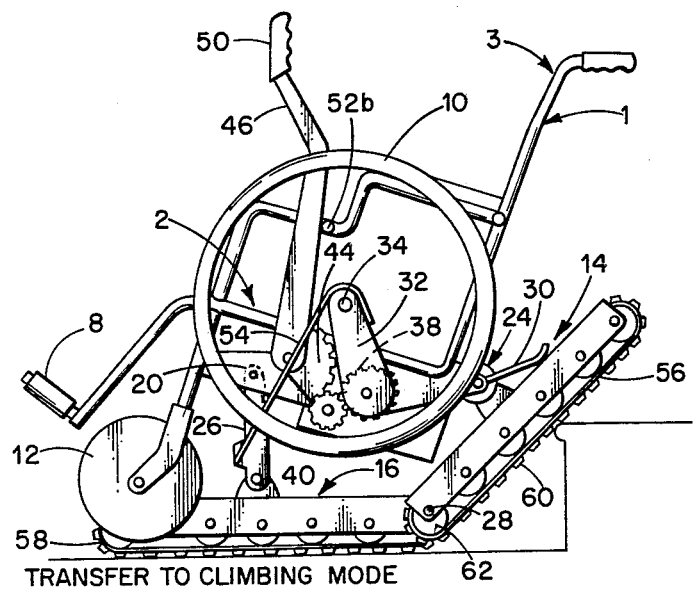
Figure 5:
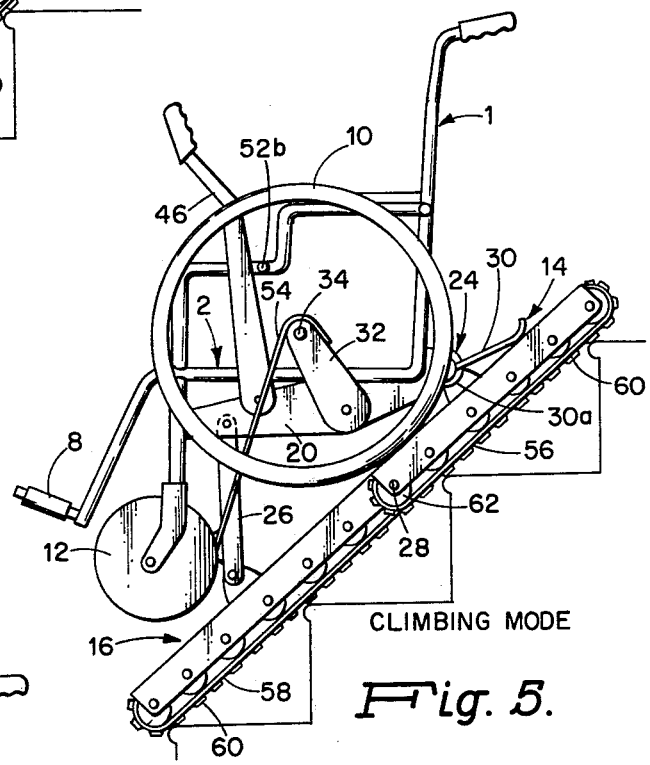

When approaching the base of a set of stairs to ascend the stairs, the wheelchair is backed up to the first step, then the left and right main wheel control levers 46 and 47 are unlocked and pushed forward simultaneously to the position shown in FIG. 4. This raises both the left and right main wheels and at the same time releases cable 54 allowing the force of tortion spring 30 to lower the track assemblies and so the chair lowers onto the left and right pairs of continuous traction belt assemblies. Clearly, by this action, the chair is lowered substantially bringing the center of gravity of the chair and operator substantially closer to the floor and to the stairs and, at the same time, tilting the chair backward so that the operator assumes a more reclined position. The left and right wheel control levers are then locked in the forward position (or wheel raised position) by a suitable lever lock mechanism such as 52b.

As the wheels are raised and the weight of the wheelchair and operator rests upon the left and right side traction belt assemblies (which are lowered as the wheels are raised), these traction belt assemblies pivot as necessary to conform to the stairs by their hinge connections to the mount plate. At the same time, the chair tilts backward and the front caster wheels 12 and 13 are raised from the floor. At this position, shown in FIG. 4, the total weight of the chair and operator is carried by the left and right side pairs of traction belt assemblies. The rear traction belt assemblies 14 and 15 engage the first step of the stairs in symmetrical fashion and the forward traction belt assemblies 16 and 17 contact the floor at the base of the stairs. The operator then engages a mechanism to drive the continuous belts on both the left and the right side in unison to climb the stairs.

For this drive, an electric motor may be provided for each pair of traction belts and a separate speed control provided for each motor. Details of this drive system and details of the rear and forward traction belt assemblies 14 and 16 are described hereinbelow with reference to FIGS. 8 to 11. Those details relate to one suitable drive mechanism and construction of the traction belt assemblies. It should be clearly understood that other drive mechanisms such as a manual drive mechanism could be substituted for this electric drive without departing from the spirit and scope of the present invention.

CLIMBING MODE

As the two left side traction belts 56 and 58 and the two right side traction belts 57 and 59 are driven together at the same speed, the chair climbs the steps. These belts all include cleats such as 60 which are particularly designed to engage and hold the front edge of the stairs. Each belt is carried in its corresponding assembly by a drive wheel and a plurality of idler wheels, also called bogie wheels. For example, the forwardmost wheel of the rear belt assembly 14 is the drive wheel 62 and the rearmost wheel of the forward belt assembly 16 is drive wheel 64. These drive wheels 62 and 64 are on the common axel 28. The axel 28 pivotally connects the rear and forward belt assemblies together and also delivers drive torque and speed to the two drive wheels 62 and 64. Hence, the drive delivered to the belts, whether by a drive motor or by a manually actuated mechanism is delivered via axel 28. It is generally preferred that the speed of this drive to the left side and to the right side be separately controlled by the operator to enable the operator to steer the chair during the climbing or descending mode just as any tractor-type vehicle is steered.

The length of the rear belt 56 and the forward belt 58 need not be the same. It is, however, generally preferred that the two belts, as extended straight in FIG. 5, clearly span at least three full steps. This provides four points of engagement of the tracks with the edges of the steps. It should be noted that in the climbing mode shown in FIG. 5 the seat is very close to the tread of the stairs and the operator can easily touch the stair treads alongside and just above the climbing chair. In fact, the operator is sitting at a level which is below the level of the highest step engaged by the rear traction belts 56 and 57 and this gives the operator a feeling of security. It also permits the operator to climb out of the wheelchair onto the stairs, if necessary, without requiring that he step down from a height substantially above the stair treads. This factor also increases the feeling of security and confidence of the operator.

TRANSITION OVER TOP STEP

When the top step of the stairway is reached, the two rear traction belt assemblies 14 and 15 pivot with respect to the forward traction belt assemblies 16 and 17, as required for the rear assemblies to follow the level of the last step. This requires, for example, that the rear assembly 14 pivot clockwise with respect to the forward assembly 16 at the axel 28. This pivoting causes the chair to tilt backward and in fact, brings the seat even closer to the top step giving the operator even greater feeling of security.

Figure 6:
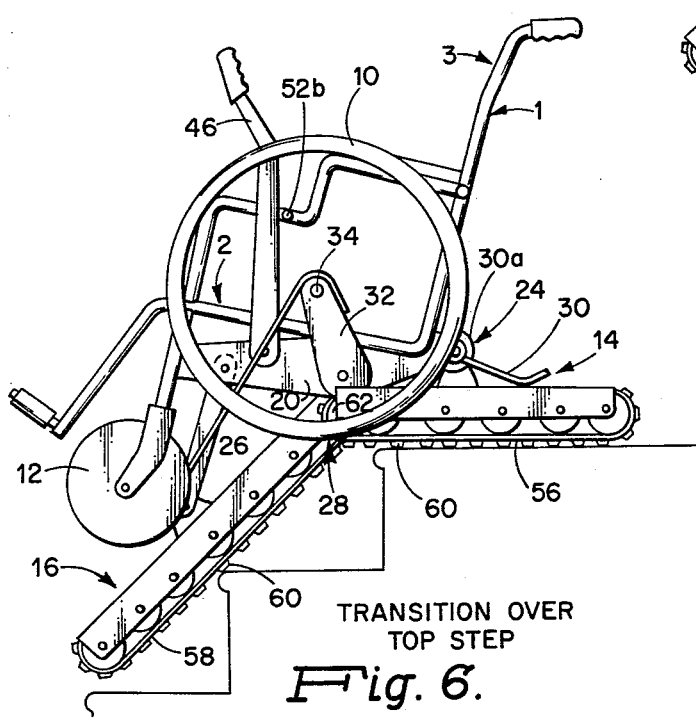

From the transition position shown in FIG. 6, the traction belts continue to drive and carry the wheel chair to the position shown in FIG. 7 which is referred to herein as the reclining mode. In the reclining mode, the rear and forward traction belt assemblies are oriented with reference to the chair just as in the climbing mode, however, the traction belt assemblies are level and the chair is tilted considerably to the rear.

From the reclining mode shown in FIG. 7, the chair is raised back up to the floor mode shown in FIG. 1 by the operator when he returns the left and right wheel control levers 46 and 47 to their rear locked positions. This action drives the main wheel arms 32 and 33 clockwise as viewed in FIG. 1 lowering the main wheels so that they engage the floor. As the load of the chair and operator is supported by the main wheels, this load is taken off of the left and right traction belt assemblies and the assemblies are drawn to their retracted position by the left and right side cables 54 and 55. This action also returns the forward caster wheels 12 and 13 to the floor and distributes part of the total load of the chair and operator to those wheels.

CONTINUOUS TRACTION BELT DRIVE MECHANISM

The left side traction belt assemblies 14 and 16 are shown by a larger view in FIG. 8 to reveal a greater amount of detail. Various views of FIG. 8 are also shown in FIGS. 9, 10 and 11. The rear and forward belt assemblies 14 and 16 are very similar in construction, inasmuch as each consists of a housing, an endless traction belt, a drive wheel, bogie wheels and a hinge for attachment to a frame plate. The rear housing 66 and the forward housing 68 may have the same cross section shape as illustrated in FIGS. 11 and 10. This includes a channel in which the drive and bogie wheels are mounted, alongside a reversed channel which provides a sliding surface alongside the belt.

FIG. 8 does not show the chair frame 1 on the large side wheel 10 or the mechanism 22. However, in addition to the rear and forward track assemblies 14 and 16, this figure shows the wheel arm 32 and cable 54 that wraps around the arm and retracts the track assemblies. One end of the cable attaches to the arm 54a. The other end of the cable attaches to link 26 at 54b at a projection 26b from the link. The link 26 is on the inside of frame plate 20 and arm 32 is on the outside of the plate. Hence, the cable is on the outside also and the projection 26b must clear the bottom of plate 20 and extend to the outside of the plate for attachment at 54b to the end of the cable. Clearly, when this projection 26b meets the bottom of the plate, retraction stops and lowering of the wheels stops.

The rear assembly 14 includes within the housing 66 the drive wheel 62, endless traction belt 56 and five bogie wheels 70a to 70e. Hinge member 72 attached to the housing pivotally connects to support plate 20 at hinge axel 74 and defines hinge 24. The tortion spring 30 urging the rear assembly 14 to rotate clockwise on hinge 24 and hydraulic damper 30a which dampens the speed of rotation in both directions are attached at the hinge. Similarly, the forward assembly 16 consists of housing 68 containing drive wheel 64 and six bogie wheels 76a to 76f. Hinge member 78 attached to housing 68 at substantially the center thereof, pivotally connects to one end of link 26 by an axel 80 and link 26 pivotally connects to plate 20 on axel 82.

The front and rear belt assemblies 14 and 16 pivotally connect at axel 28 which is the common axel engaging both drive wheels 62 and 64. The two assemblies pivotally connect at axel 28 by interleaved fingers at the ends of their respective housings 66 and 68. For example, two spaced fingers, 82 and 84 attached to housing 66 interleave with two spaced fingers 86 and 88 attached to the end of housing 68. These interleaved fingers may be carried on a separate hollow axel 90 concentric with axel 28 and so, the pivot load is not carried by axel 28 which serves only to hold and deliver drive torque to the drive wheels 62 and 64.

The drive torque and power may be delivered to axel 28 by an electric motor 92 (the left side drive motor) which is supported by a housing 94 fixedly attached to the rear assembly housing 66. A reduction gear train 96 may be provided from the motor output drive shaft to axel 28. A corresponding drive system is provided for the right side traction belts.

Where electric motor drive is provided, it is preferred that there be a separate motor for the belt drives on each side of the chair as this is one way to provide separate speed drive controls for the left and right sides of the chair. If a single motor were provided, then a left and a right variable transmission could be provided for varying the left and right speeds independently.

In order to lend rigidity to the traction belt drive mechanism and to insure that they are positioned in unison, even though they are not necessarily driven at the same speed, it is preferred that the motor housing 94 fixedly connect also to the right rear traction belt assembly housing 67, as shown in FIGS. 2 and 3. Further rigidity may be provided by front and rear transverse connecting bars such as 97 and 98 (shown in FIGS. 2 and 3) that connect the left and right assemblies together. Clearly, this construction makes it difficult if not impossible to fold the wheelchair down the middle for easy handling as is done with many conventional wheelchairs. That feature, however, could be achieved if the left side belts and right side belts were independently manually driven by left and right drive levers manipulated by the operator.

A battery or batteries 99 for energizing the electric motors may be carried beneath the forward part of the seat. Since the batteries constitute a substantial weight, it is preferred that they be located as far to the rear as possible and yet be clear of the motor housing 94. Separate left side and right side motor speed controls 100 and 101 may be provided at the end of the chair arm rests. These may be discrete position or continuously variable position controls enabling independent left and right side control of the traction belt speeds.

The embodiment of the present invention shown in the figures is equipped with an electric motor drive for each side enabling independent speed control of the left and right traction belts. This embodiment includes all novel features of the present invention which are set forth in the various claims. It is to be clearly understood, however, that each of these features or two or more together may also find useful application in other constructions of wheelchairs and the like for useful purposes. Hence, while all features of the present invention have been illustrated and described in a single embodiment and this includes electric motors for driving the traction belts, it is not intended that the present invention be limited to such a drive mechanism and various modifications and structural changes could be made without departing from the spirit and scope of the invention.

What is claimed is:

1. A wheelchair comprising,
   a. a seat frame for carrying an operator or a load,
   b. large diameter ground contacting wheels on each side of the frame,
   c. a hub for each of said wheels, said hubs defining wheel axle which are parallel,
   d. for each wheel, a wheel arm carrying at one end thereof the wheel hub and pivotally connected at the other end to the frame,
   e. whereby rotation of the wheel arm in one direction raises the wheel and rotation in the opposite direction lowers the wheel to contact the ground and support the wheelchair,
   f. means for rotating the wheel arm including a manually operated lever pivotally attached to the frame and
   g. a drive connection between the lever and the wheel arm,
   h. whereby rotation of the lever rotates the wheel arm raising the wheel,
   i. a traction device carried by the frame and oriented to propel the wheelchair in the same direction as the wheels,
   j. traction device positioning means for positioning the traction device in a retracted position and in at least one position for propelling the wheelchair when the large diameter wheels are raised and
   k. means for driving the tractor device to propel the wheelchair.

2. A wheelchair as in claim 1 wherein,
the traction device includes one or more continuous traction belts.

3. A wheelchair as in claim 1 wherein,
there are two large diameter ground contacting wheels, one on each side of the wheelchair,
said two wheel hubs define a common axis, and
at least one other ground contacting wheel is provided to support the frame.

4. A wheelchair as in claim 3 wherein,
the other wheel is forward of the two large diameter wheels,
whereby upon raising the large wheels and positioning the traction device in position to propel the wheelchair so that the frame rides on the traction device,
the seat frame tilts backwards and the forward wheel lifts off the ground.

5. A wheelchair as in claim 4 wherein,
the traction device includes a front continuous traction belt assembly and a rear continuous traction belt assembly, each pivotally attached to the frame and
the front end of said rear assembly pivotally connects to the rear end of said front assembly.

6. A wheelchair as in claim 5 wherein,
the rear traction belt assembly pivotally connects to the frame and the front traction belt assembly pivotally connects to a supporting linkage mechanism and the linking mechanism pivotally connects to the frame.

7. A wheelchair as in claim 1 wherein, a mechanical connection between the wheel arm and the traction device is provided and driven by the wheels arm rotation in said other direction to retract the traction device when the large diameter wheels are lowered to contact the ground and support the wheelchair.

8. A wheelchair as in claim 6 wherein, a mechanical connection between the wheel arm and the linkage mechanism is provided and driven by the wheel arm rotation in said other direction to retract the front and rear traction belt assemblies when the large diameter wheels are lowered to contact the ground and support the wheelchair.

9. A wheelchair as in claim 7 wherein, the mechanical connection between the wheel arm and traction device acts unidirectionally.

10. A wheelchair as in claim 8 wherein, the mechanical connection between the wheel arm and linkage mechanism acts unidirectionally.

11. A wheelchair as in claim 1 wherein, the axes of the lever pivotal connection and the wheel arm pivotal connection are parallel to the large wheel axes.

12. A wheelchair as in claim 11 wherein, means are provided for locking the wheel arm when the large diameter wheel is down in contact with the ground and supporting the frame.

13. A wheelchair as in claim 5 wherein, each traction belt assembly includes a wheel, driven by said traction drive means, at least one bogie wheel and a continuous traction belt engaging the driven and bogie wheels, the front wheel of the rear assembly is the driven wheel thereof and the rear wheel of the front assembly is the driven wheel thereof and said driven wheels are driven by a common drive axle and drive power apparatus is provided for driving said common drive axle when the belt assemblies contact the ground and support the seat frame.

14. A wheelchair as in claim 13 wherein, said drive power apparatus for driving said common drive axle includes an electric motor, a source of electrical energy for energizing said motor and means for controlling the energization of the motor.

15. A wheelchair as in claim 1 and further including, resilient means acting between the frame and the traction device urging the traction device from the retracted position to a position for propelling the wheelchair.

16. A wheelchair as in claim 1 and further including, damper means acting between the frame and the traction device for dampening the velocity of changes in the position of the traction device from a position for propelling to the retracted position.

17. A wheelchair comprising, a. a seat and frame, b. two large wheels, one on each side of the frame, c. a hub for each wheel, the hubs defining parallel wheel axes, d. at least one forward ground contacting wheel to support the frame located forward of the large wheels, e. a traction device carried by the frame including a front continuous traction belt assembly and a rear continuous traction belt assembly, each pivotally attached to the frame, f. the front end of the rear traction belt assembly being pivotally connected to the rear end of the front traction belt assembly, g. for each wheel, a wheel arm carrying the wheel hub at one end thereof and pivotally connected to the frame at the other end thereof, h. the front traction belt assembly is pivotally connected to a supporting linkage mechanism that pivotally connects to the frame, i. a mechanical connection between the wheel arm and the linkage mechanism is provided and driven by the wheel arm rotation to retract the front and rear traction belt assemblies when the large diameter wheels are lowered to contact the ground and support the wheelchair, j. so that upon raising the large wheels the seat tilts backward riding on the traction device, and k. means for driving the traction device to propel the wheelchair.

18. A wheelchair as in claim 17 wherein, a. the mechanical connection between the wheel arm and linkage mechanism acts unidirectionally.

19. A wheelchair as in claim 17 and further including, a. means for rotating the wheel arm including a manually operated lever pivotally attached to the frame and b. a drive connection between the lever and the wheel arm whereby rotation of the lever rotates the wheel arm raising the wheel.

20. A wheelchair as in claim 19 wherein, a. the axes of the lever pivotal connection and the wheel arm pivotal connection are parallel to the large wheel axes.

21. A wheelchair comprising, a. a seat frame for carrying an operator or a load, b. large diameter ground contacting wheels on each side of the frame, c. a hub for each of said wheels, said hubs defining wheel axis which are parallel, d. a traction device carried by the frame and oriented to propel the wheelchair in the same direction as the wheels, e. means connected to the large diameter wheel hubs and to the frame for raising and lowering the large diameter wheels relative to the frame so that when raised, the wheels do not contact the ground and the frame rides on the traction device, f. traction device positioning means for positioning the traction device in a retracted position and in at least one position for propelling the wheelchair when the large diameter wheels are raised and g. mechanical means connecting the means for raising the wheels and the traction device positioning means so that the traction device is retracted when the wheels are lowered and put in the propelling position when the wheels are raised and h. means for driving the traction device to propel the wheelchair.

22. A wheelchair as in claim 21 wherein, a. the traction device includes a front continuous traction belt assembly and a rear continuous traction belt assembly, at least one of said assemblies being pivotally attached to the frame, and b. said front and rear traction belt assemblies are pivotally connected to each other.

23. A wheelchair as in claim 22 wherein, a. mechanical means defined by clause (g) of claim 22 acts unidirectionally to retract the traction device by causing it to pivot at said pivotal attachment to the frame.

* * * * *